United States Patent
Lin

(10) Patent No.: US 11,566,644 B2
(45) Date of Patent: Jan. 31, 2023

(54) CLAMP SLEEVE

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 194 days.

(21) Appl. No.: 17/096,954

(22) Filed: Nov. 13, 2020

(65) Prior Publication Data

US 2021/0148388 A1 May 20, 2021

(30) Foreign Application Priority Data

Nov. 14, 2019 (CN) .......................... 201921966260.9

(51) Int. Cl.
*F16B 2/06* (2006.01)
*F16F 1/02* (2006.01)

(52) U.S. Cl.
CPC .............. *F16B 2/065* (2013.01); *F16F 1/027* (2013.01)

(58) Field of Classification Search
CPC .......... F16B 2/065; F16B 2/06; F16B 7/1418; F16M 2200/022; F16M 2200/027; F16F 1/027

See application file for complete search history.

(56) References Cited

U.S. PATENT DOCUMENTS

| | | | | |
|---|---|---|---|---|
| 2,151,768 | A | * 3/1939 | Humeston | F41G 11/003 248/316.1 |
| D123,589 | S | * 11/1940 | Eden | D8/396 |
| 6,164,604 | A | * 12/2000 | Cirino | F16L 3/04 248/74.3 |
| D631,905 | S | * 2/2011 | Sandell | D16/245 |
| 2016/0160524 | A1 | * 6/2016 | Malins | F16M 13/02 248/217.4 |
| 2018/0258968 | A1 | * 9/2018 | Mawlam | A47L 13/50 |

* cited by examiner

*Primary Examiner* — Robert Sandy
*Assistant Examiner* — Rowland Do
(74) *Attorney, Agent, or Firm* — Lin & Associates Intellectual Property, Inc.

(57) ABSTRACT

A clamp sleeve, including: a body and a first fastening assembly. The body has first and second ends, and includes a receiving portion therein. The receiving portion has first and second openings at the first and second ends. The body is provided with a gap, the gap has two ends extending to the first and second openings, and the gap is communicated with the receiving portion. The body is provided with first extending portions at two sides of the gap along a longitudinal direction, the first extending portions is provided with a first connecting sheet near the first opening, and the first connecting sheet is connected to each of the first extending portions and connected with the first opening. The first connecting sheet is provided with a first thin thread intersecting with the gap. The first fastening assembly is disposed on the first extending portions.

4 Claims, 15 Drawing Sheets

CLAMP SLEEVE

CROSS-REFERENCE TO RELATED APPLICATION

This application claims the priority of CN patent application No. 201921966260.9, filed on Nov. 14, 2019, the content of which is incorporated herein by reference.

BACKGROUND OF THE INVENTION

1. Field of the Invention

The present invention relates to a clamp sleeve, and more particularly to a clamp sleeve having a connecting sheet.

2. The Prior Arts

The existing clamp sleeves have a gap and a fastener, and a size of the gap can be controlled by the fastener. As such, the clamp sleeve and an object to be clamped can be controlled in a loosen state or a locked state.

A common problem of the existing clamp sleeves is that, if the clamp sleeve is always in a clamped state, when the fastener is loosened, the clamp sleeve may lack elasticity so as not to enlarge the gap; therefore the sliding between the object and the clamp sleeve is not smooth. The existing solution is to add a spring in the gap, so that the gap can be enlarged by a spring force when the fastener is in a loosen state. However, if the spring force is not enough or the spring is missed, the gap cannot rebound to a suitable size when the fastener is in the loosen state.

SUMMARY OF THE INVENTION

To solve the problem that after a long time use of the clamp sleeve, the gap cannot rebound to the suitable size when the fastener is in the loosen state, the present invention provides with a first connecting sheet disposed at a gap and first extending portions, and the first connecting sheet has a first thin thread. When a first fastening assembly is in a locked state, two first extending portions close to each other, the gap becomes narrower, the first connecting sheet produces a breakage along the first thin thread, and the first connecting sheet bulges due to a push force applied thereon by the two first extending portions, and when the first fastening assembly is in a loosen state, the two first extending portions are pushed away from each other due to a restoring force applied thereon by the first connecting sheet, the gap becomes wider, and the first connecting sheet recovers to be flat.

Therefore, a technical solution of the present invention is to provide a clamp sleeve adapted to be sleeved on an object, comprising: a body and a first fastening assembly. The body has a first end and a second end, and the body includes a receiving portion therein. The receiving portion has a first opening and a second opening respectively at the first end and the second end. The body is provided with a gap at a suitable position of a circumference of the body, the gap has two ends respectively extending to the first opening and the second opening, and the gap is communicated with the receiving portion. The body is provided with a first extending portion at a suitable position at each of two sides of the gap along a longitudinal direction thereof, the first extending portion is provided with a first connecting sheet at a position near the first opening, and the first connecting sheet is connected to each of the two first extending portions and connected with the first opening. The first connecting sheet is provided with a first thin thread, and the first thin thread intersects with the gap. The first fastening assembly is disposed on each of the first extending portions. When the object is inserted into the receiving portion and the first fastening assembly is in a locked state, the two first extending portions close to each other, the gap becomes narrower, the first connecting sheet produces a breakage along the first thin thread, and the first connecting sheet bulges due to a push force applied thereon by the first extending portions. When the first fastening assembly is in a loosen state, the two first extending portions are pushed away from each other due to a restoring force applied thereon by the first connecting sheet, the gap becomes wider, and the first connecting sheet recovers to be flat.

Preferably, a maintaining portion is disposed at a suitable position of the second end of the gap, the maintaining portion has two sides respectively connected with the body, and the maintaining portion is provided with a second thin thread at one side thereof.

Preferably, the clamp sleeve further comprises three leg tubes, and the body is provided with two second extending portions and two third extending portions at suitable positions outside the body along the longitudinal direction. The two second extending portions are provided with a second connecting sheet at a position near the first opening, and the second connecting sheet is connected to each of the two second extending portions and connected with the first opening. The two third extending portions are provided with a third connecting sheet at a position near the first opening, and the third connecting sheet is connected to each of the two third extending portions and connected with the first opening. The second extending portions and the third extending portions respectively are provided with a second fastening assembly and a third fastening assembly, such that one end of each of the three leg tubes is disposed in a pivotable manner between the two first extending portions, between the two second extending portions, and between the two third extending portions respectively by the first fastening assembly, the second fastening assembly, and the third fastening assembly.

Preferably, the first extending portion is provided with a fourth fastening assembly, and the receiving portion has an upper portion and a lower portion adjacent to each other. The upper portion is communicated with the first opening, and the lower portion is communicated with the second opening. A diameter of the upper portion is smaller than a diameter of the lower portion. The object includes an inner tube and an outer tube, and a tube diameter of the inner tube is smaller than a tube diameter of the outer tube. When the outer tube is inserted into the lower portion through the second opening and the fourth fastening assembly is in a locked state, the gap becomes narrower, and the outer tube and the body are fixed with respect to each other. When the inner tube is inserted into the upper portion through the first opening and received in the outer tube and the first fastening assembly is in a loosen state, the inner tube and the outer tube are slidable with respect to each other, and when the first fastening assembly is in a locked state, the inner tube and the body are fixed with respect to each other.

The beneficial effect of the present invention is that the present invention uses a rebound of the first connecting sheet itself to make the first extending portions away from each other and enlarge the gap, and thus the problems of the fixing and sliding between the clamp sleeve and the object can be effectively solved.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The implementation of the present invention will be described below with reference to FIG. 1A to FIG. 8. The description is not a limitation to the implementation of the present invention, but only for the embodiments of the present invention.

Figure 1A:
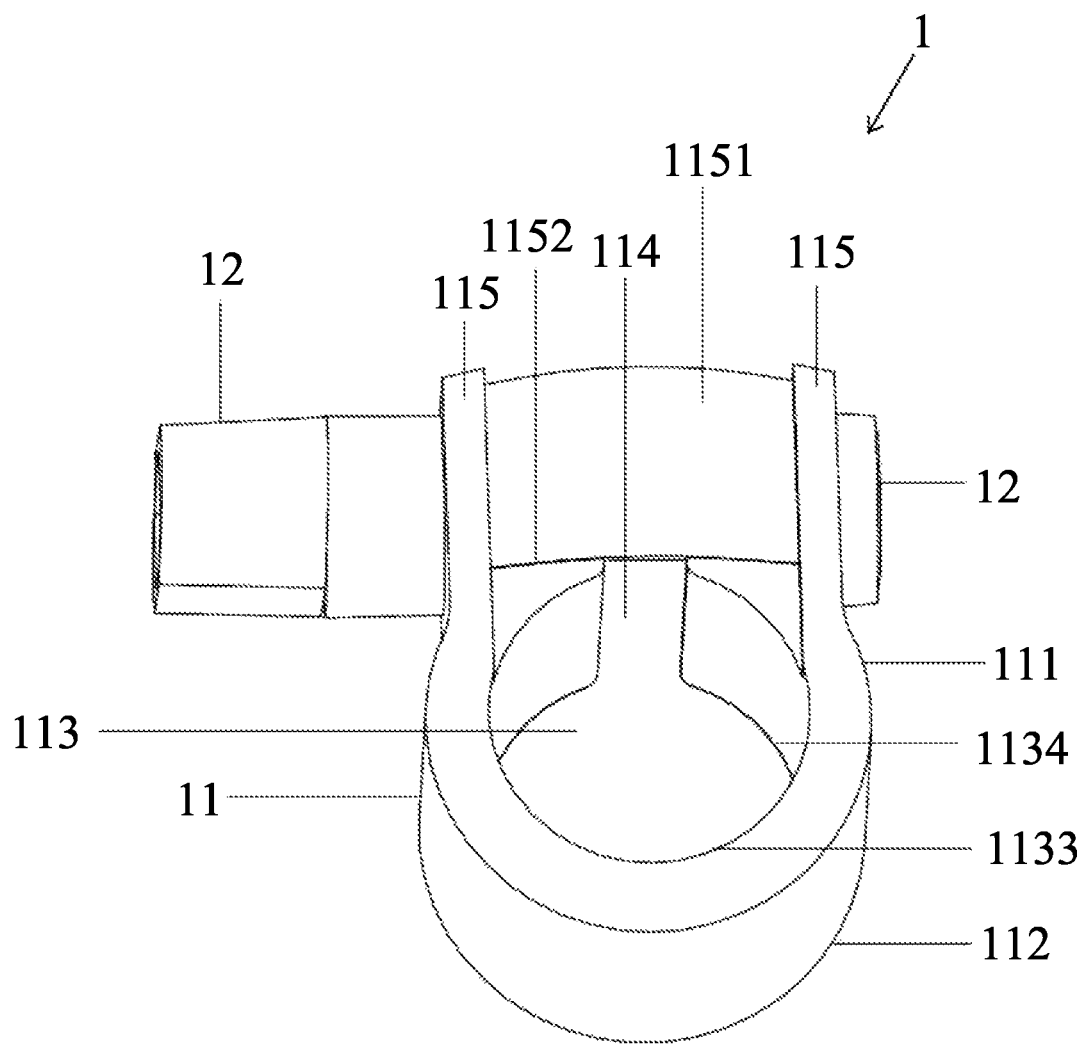
FIG. 1A is a first schematic view showing a first fastening assembly being in a loosen state according to a first embodiment of the present invention.
Figure 1B:
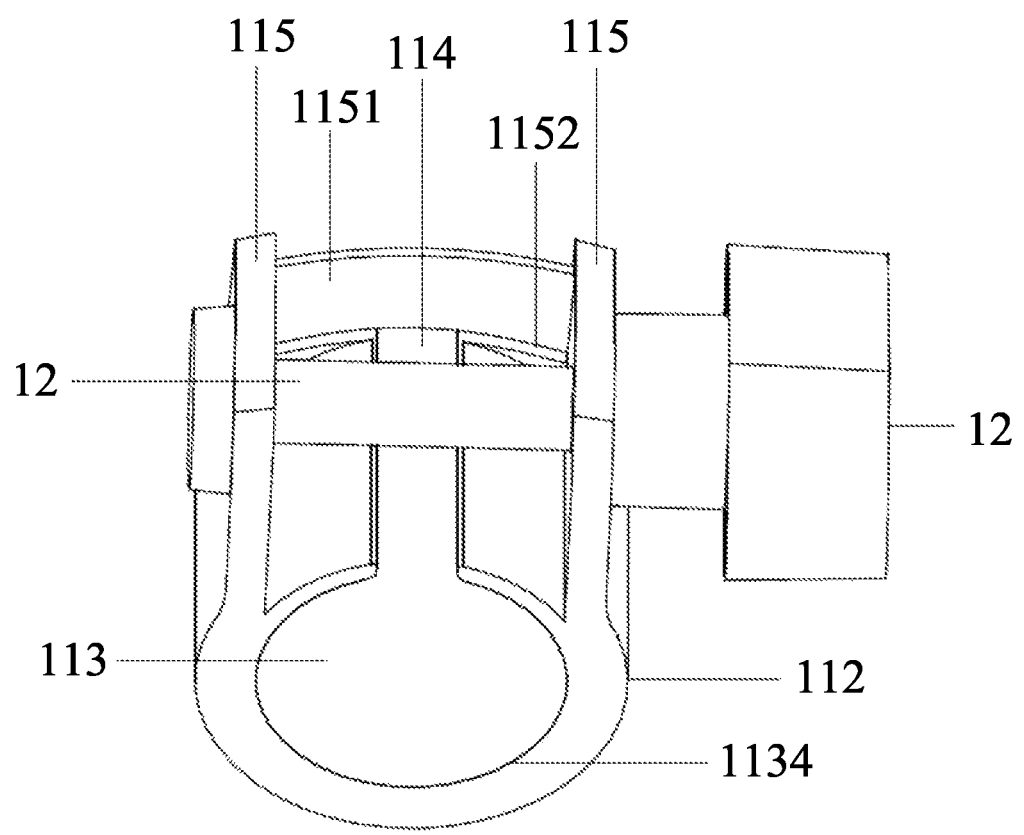
FIG. 1B is a second schematic view showing the first fastening assembly being in the loosen state according to the first embodiment of the present invention.
Figure 2A:
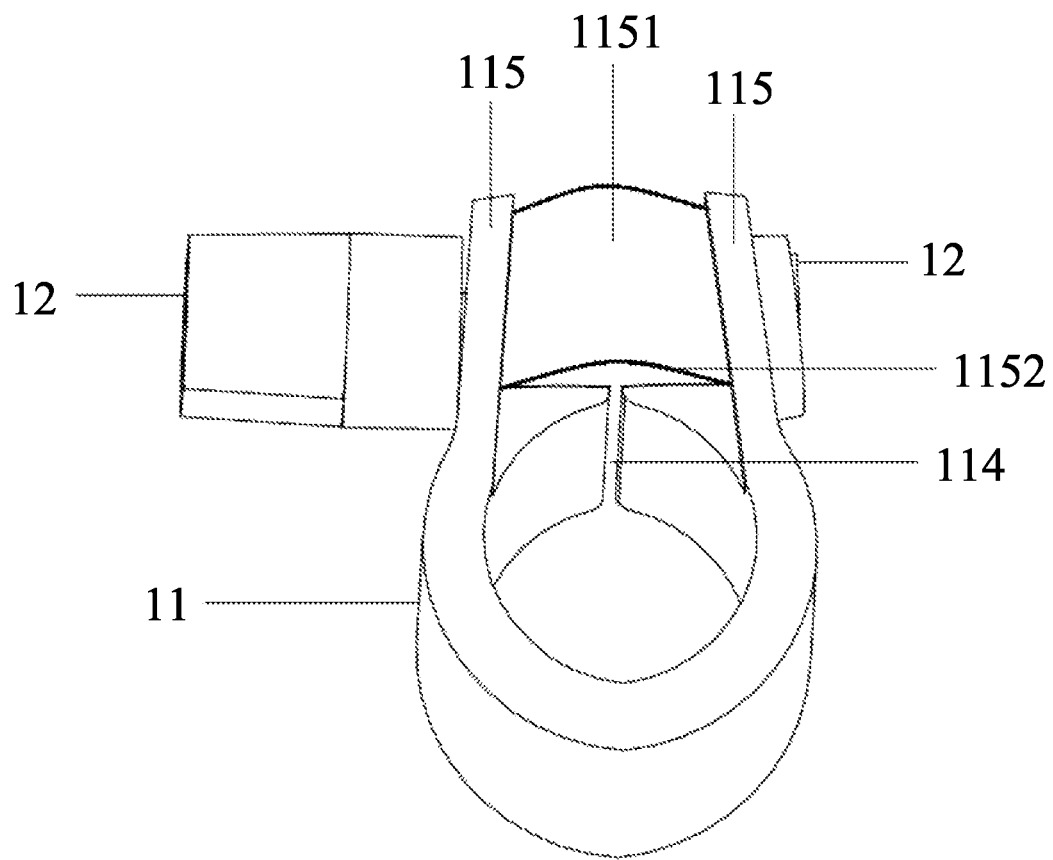
FIG. 2A is a first schematic view showing the first fastening assembly being in a locked state according to the first embodiment of the present invention.
Figure 2B:
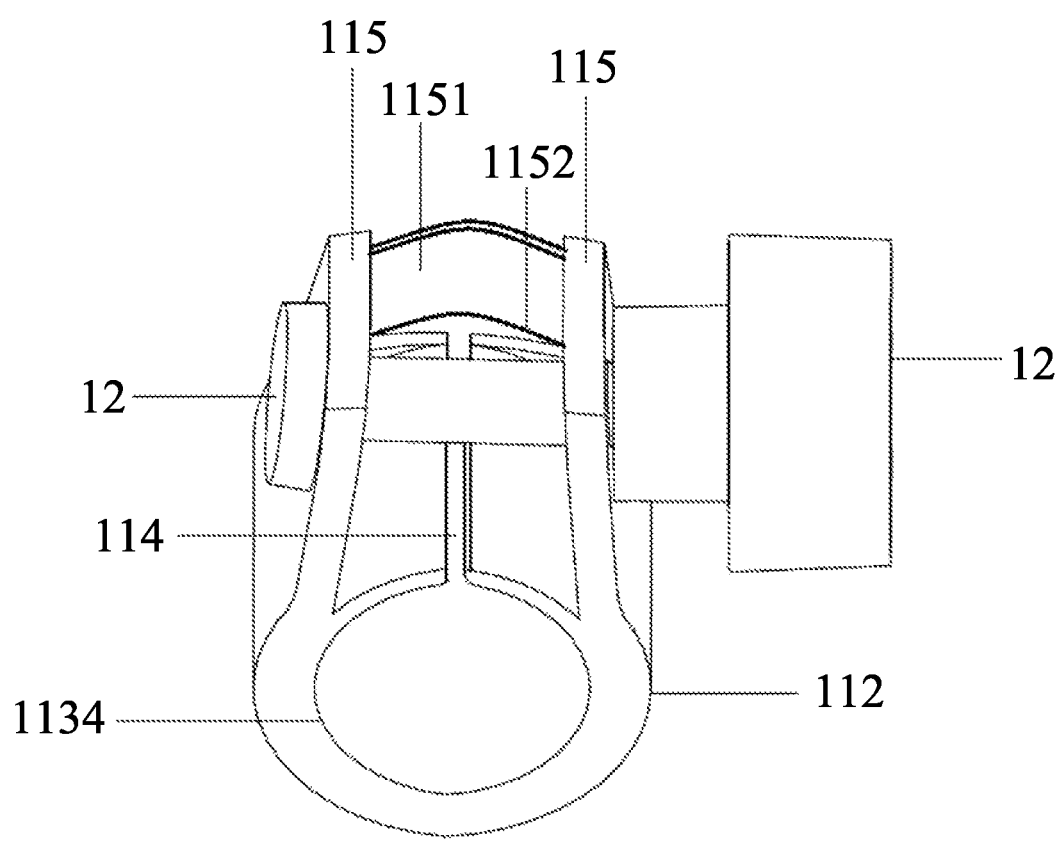
FIG. 2B is a second schematic view showing the first fastening assembly being in the locked state according to the first embodiment of the present invention.
Figure 2C:
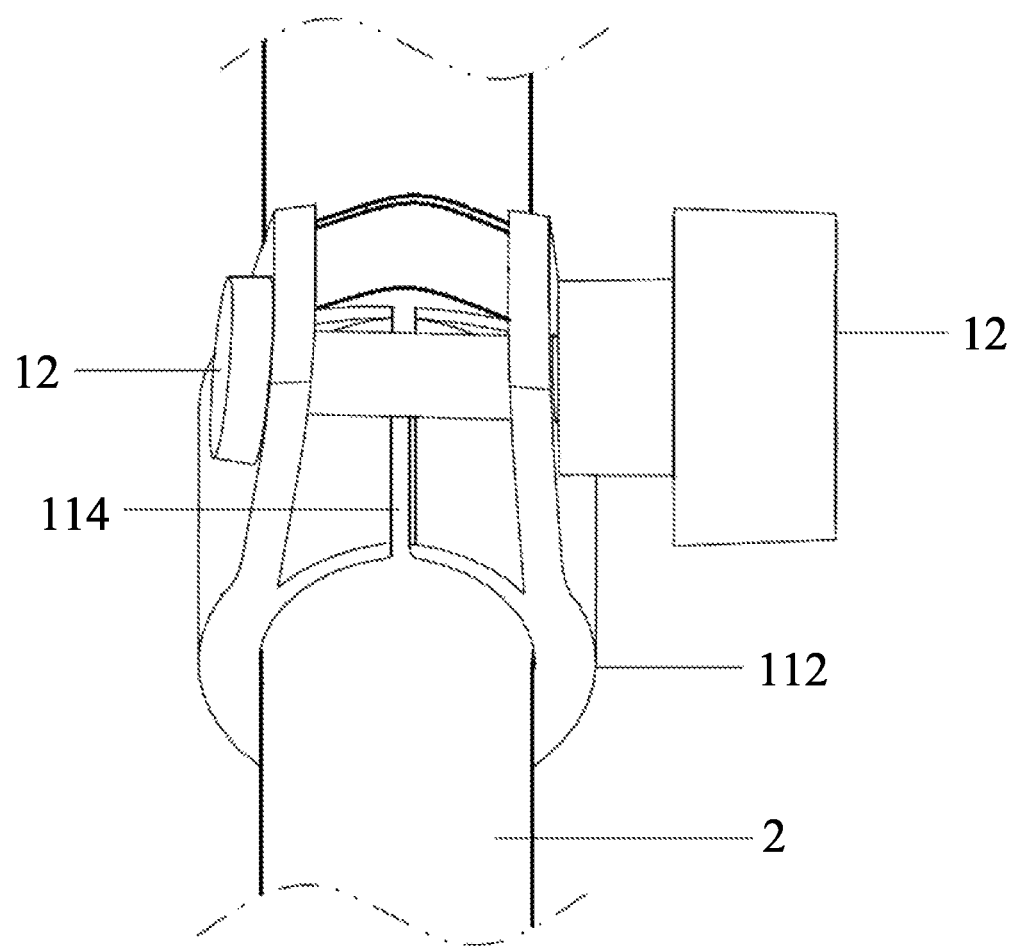
FIG. 2C is a schematic view showing an assembly that the first fastening assembly is in the locked state according to the first embodiment of the present invention.

As shown in FIG. 1A to FIG. 2C, a clamp sleeve 1 according to the present invention is adapted to be sleeved on an object 2. As shown in FIG. 1A and FIG. 1B, the clamp sleeve 1 comprises: a body 11 and a first fastening assembly 12. The body 12 has a first end 111 and a second end 112, and the body 11 includes a receiving portion therein. The receiving portion has a first opening 1133 and a second opening 1134 respectively at the first end 111 and the second end 112. The body 11 is provided with a gap 114 at a suitable position of a circumference of the body, the gap 114 has two ends respectively extending to the first opening 1133 and the second opening 1134, and the gap 114 is communicated with the receiving portion 113. The body 11 is provided with a first extending portion 115 at a suitable position at each of two sides of the gap 114 along a longitudinal direction thereof, the first extending portions 115 is provided with a first connecting sheet 1151 at a position near the first opening 1133, and the first connecting sheet 1151 is connected to each of the two first extending portions 115 and connected with the first opening 1133. The first connecting sheet 1151 is provided with a first thin thread 1152, and the first thin thread 1152 intersects with the gap 114. The first fastening assembly 12 is disposed on each of the first extending portions 115. As shown in FIG. 2A to FIG. 2C, when the object 2 is inserted into the receiving portion and the first fastening assembly 12 is in a locked state, the gap 114 becomes narrower, the two first extending portions 115 close to each other, the first connecting sheet 1151 produces a breakage along the first thin thread 1152, and the first connecting sheet 1151 bulges due to a push force applied thereon by the first extending portions 115. When the first fastening assembly 12 is in a loosen state, the two first extending portions 115 are pushed away from each other due to a restoring force applied thereon by the first connecting sheet 1151, the gap 114 becomes wider, and the first connecting sheet 1151 recovers to be flat. In the present invention, because of a support from the first connecting sheet 1151, the first opening 1133 is kept at a suitable dimension in the manufacturing process. When the first fastening assembly 12 is locked for the first time, the first thin thread 1152 produces a breakage and thus the dimension of the opening can be adjusted by the first fastening assembly 12.

Figure 3:
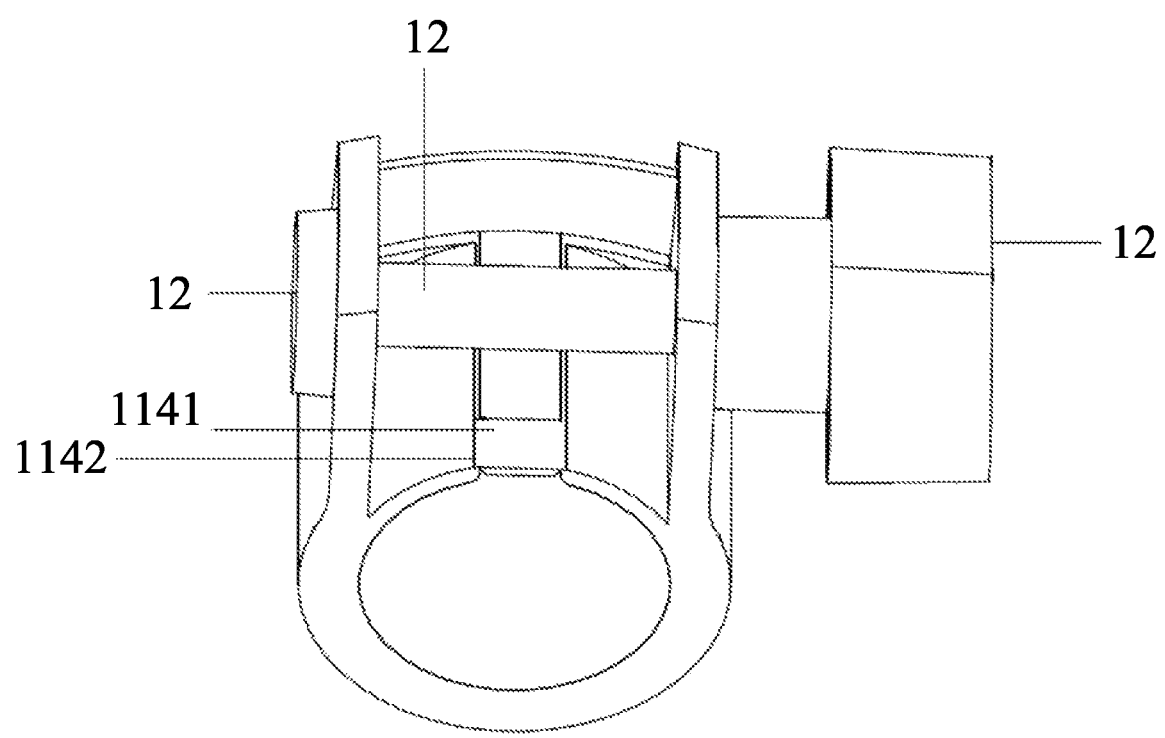
FIG. 3 is a schematic view showing a first fastening assembly being in the loosen state according to a second embodiment of the present invention.
Figure 4:
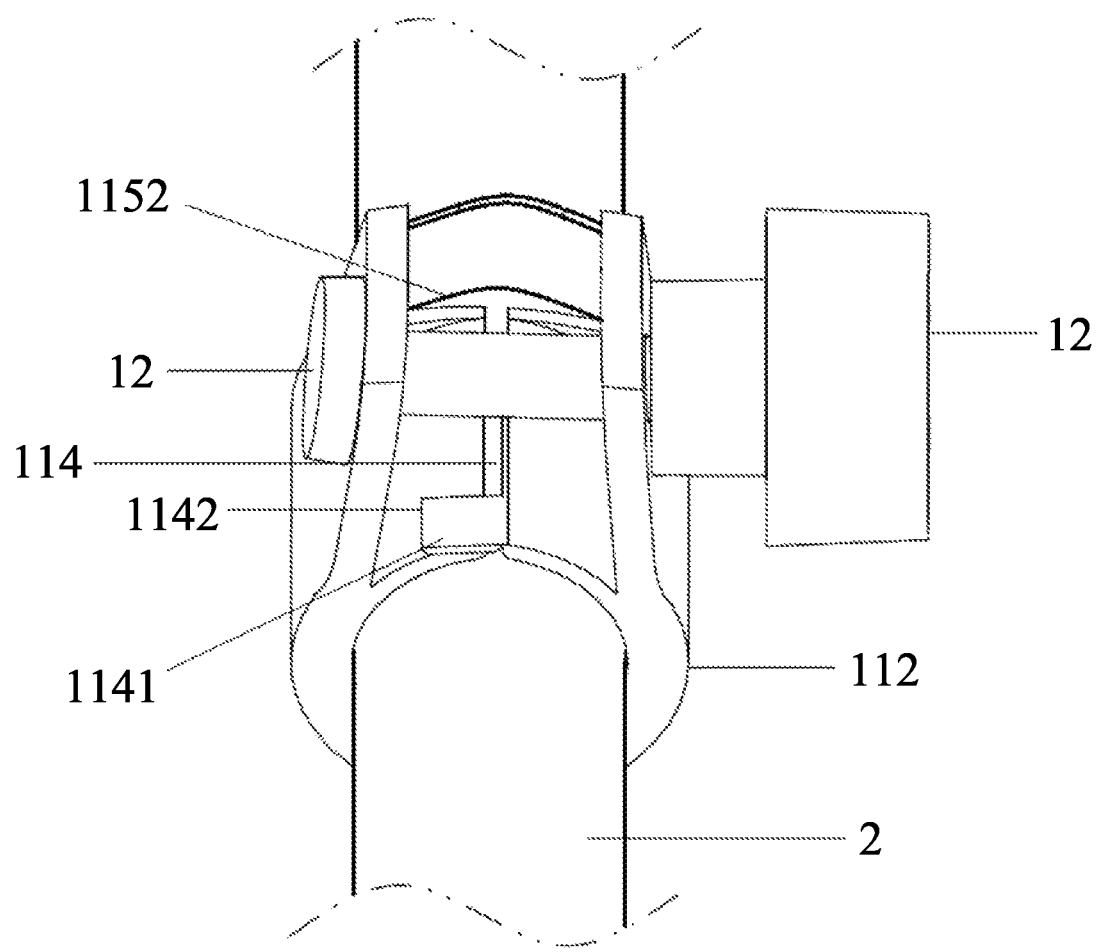
FIG. 4 is a schematic view showing an assembly that the first fastening assembly is in the locked state according to the second embodiment of the present invention.

As shown in FIG. 3 and FIG. 4, in a second embodiment, a maintaining portion 1141 is disposed at a suitable position of the second end 112 of the gap 114, the maintaining portion 1141 has two sides respectively connected with the body 11, and the maintaining portion 1141 is provided with a second thin thread 1142 at one side thereof. As shown in FIG. 4, when the first fastening assembly 12 is in a locked state, the first extending portions 115 are pushed, such that the gap 114 becomes narrower, and the second thin thread 1142 produces a breakage. In this embodiment, it can be ensured that the second opening 1134 of the body 11 is kept at a suitable dimension in the manufacturing process. When the first fastening assembly 12 is locked for the first time, the second thin thread 1142 produces a breakage. As such, the production efficiency may be improved.

Further, the first connecting sheet 1151 is formed to have a wavy surface at a side facing each of the two first extending portions 115, and the wavy surface allows the first connecting sheet 1151 to be evenly stressed when the first connecting sheet 1151 deforms to form a bulge.

Figure 5A:
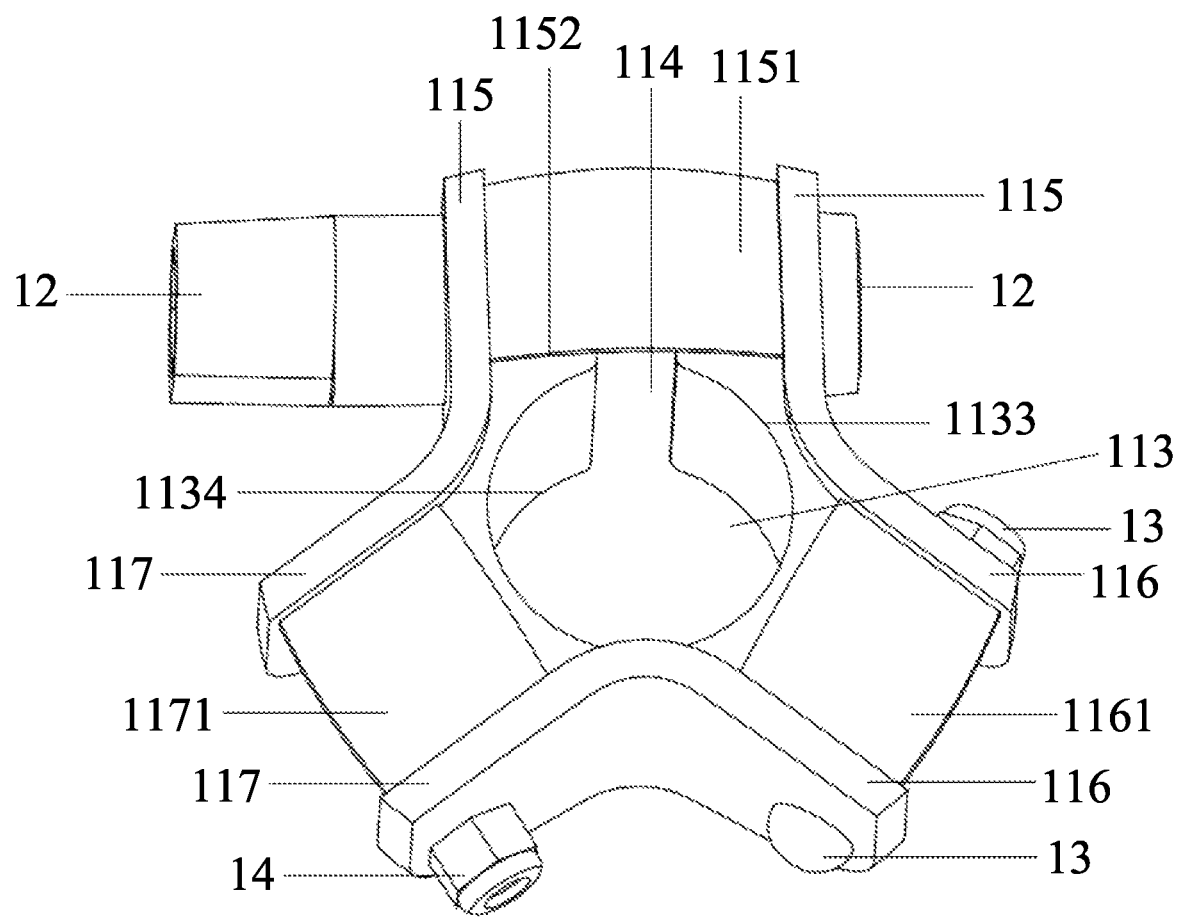
FIG. 5A is a first schematic view showing a first fastening assembly being in the loosen state according to a third embodiment of the present invention.
Figure 5B:
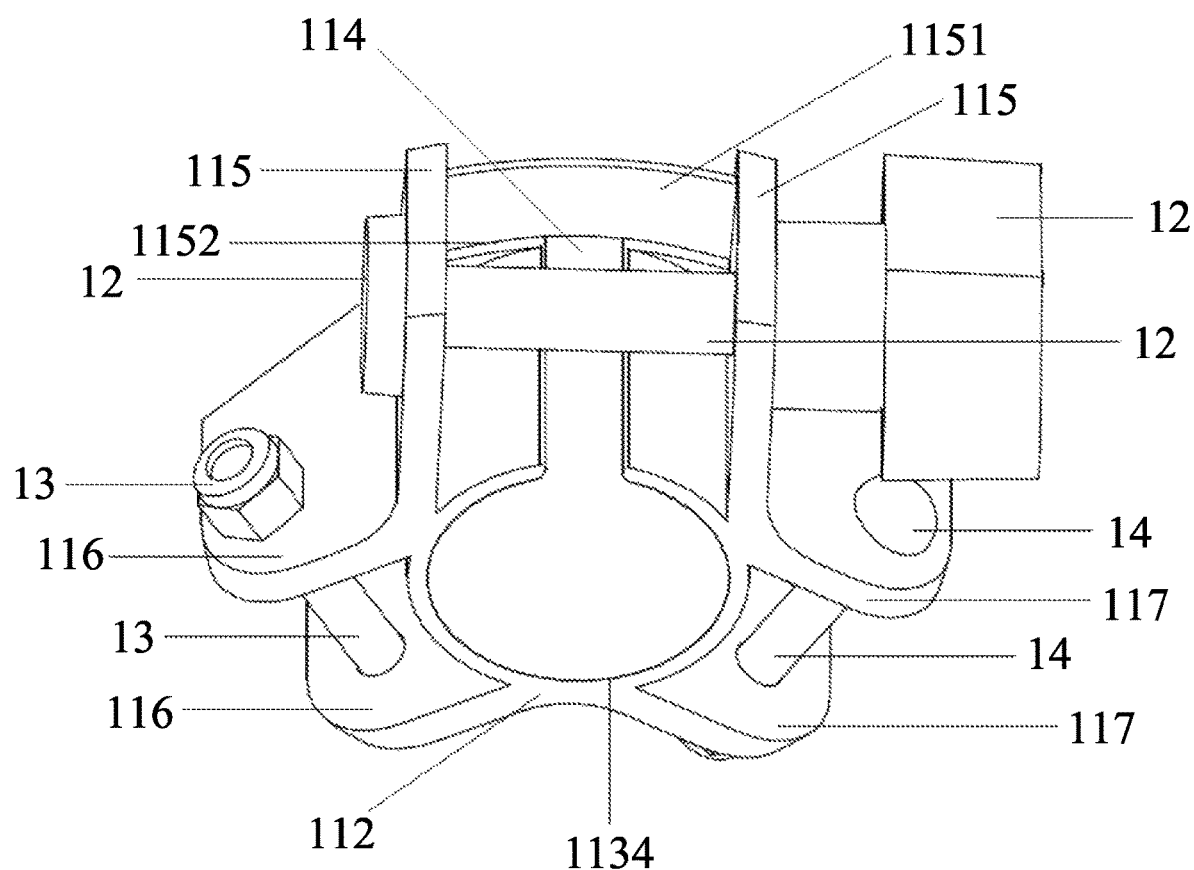
FIG. 5B is a second schematic view showing the first fastening assembly being in the loosen state according to the third embodiment of the present invention.
Figure 6A:
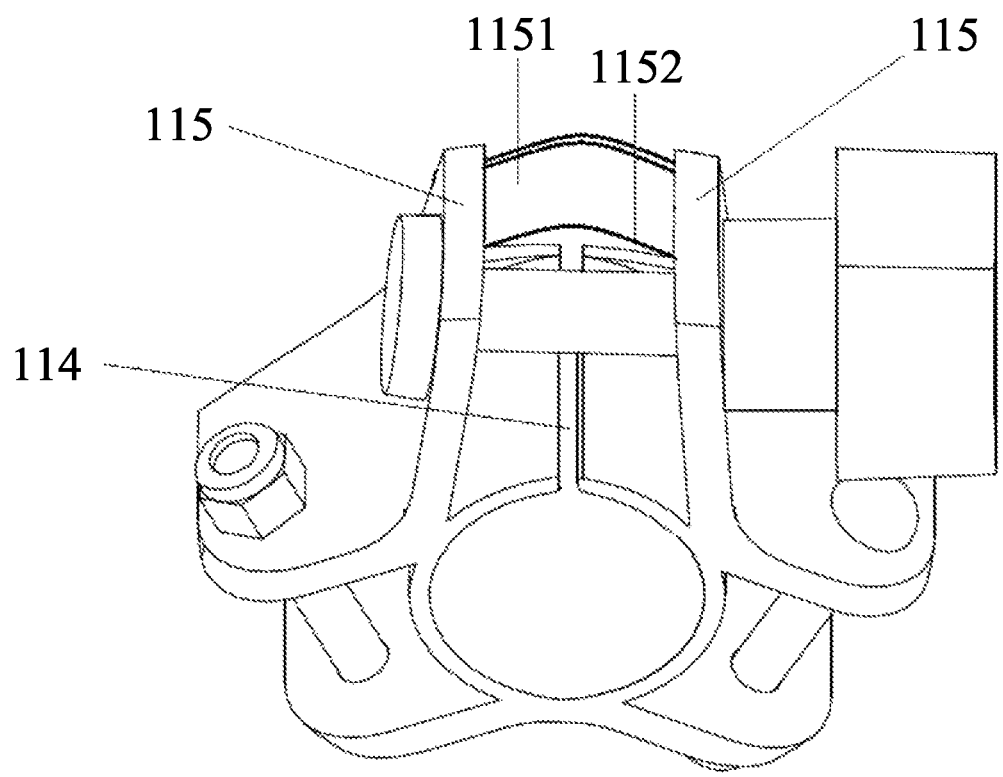
FIG. 6A is a schematic view showing the first fastening assembly being in the locked state according to the third embodiment of the present invention.
Figure 6B:
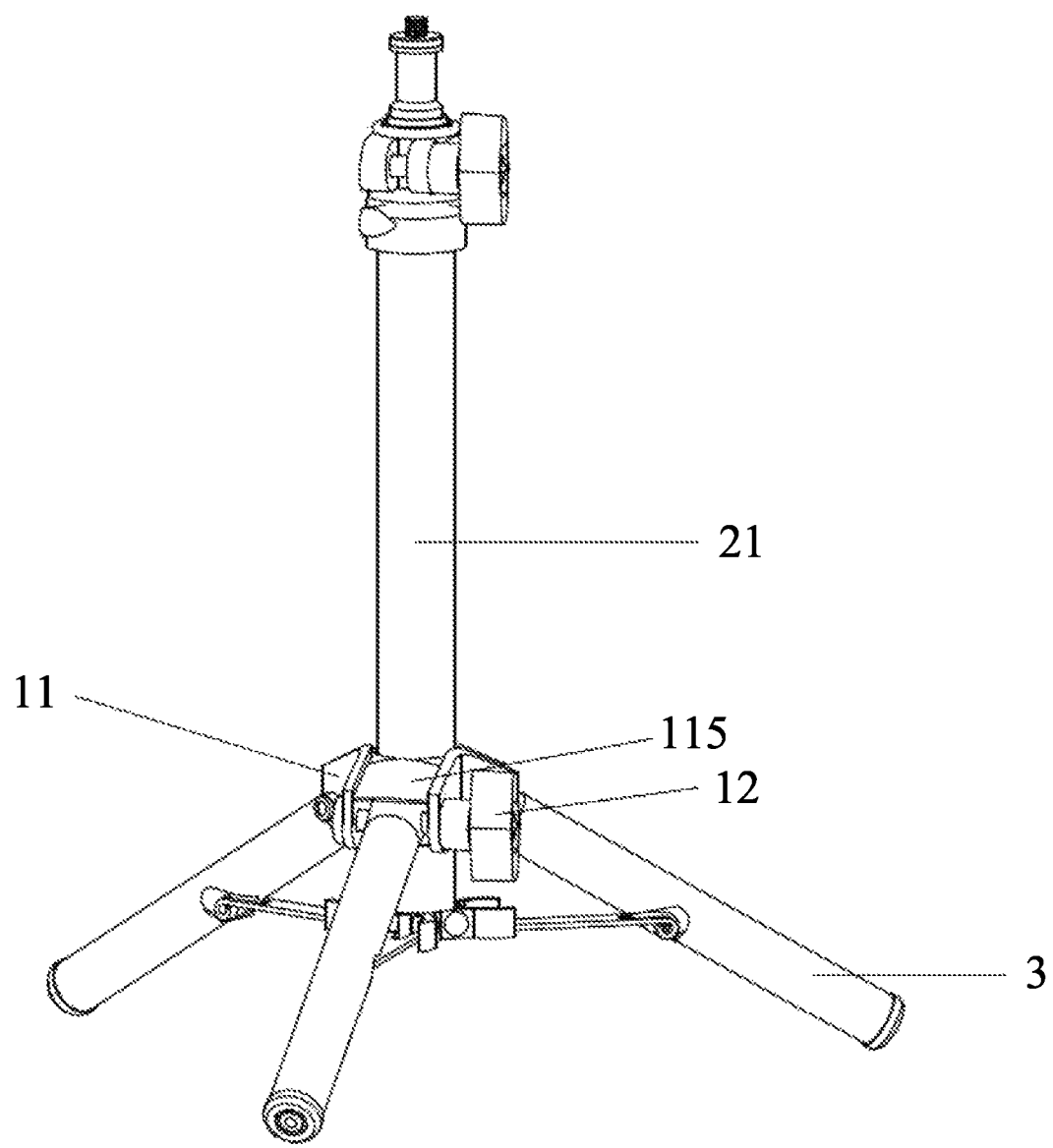
FIG. 6B is a schematic view showing an assembly that the first fastening assembly is in the locked state according to the third embodiment of the present invention.
Figure 6C:
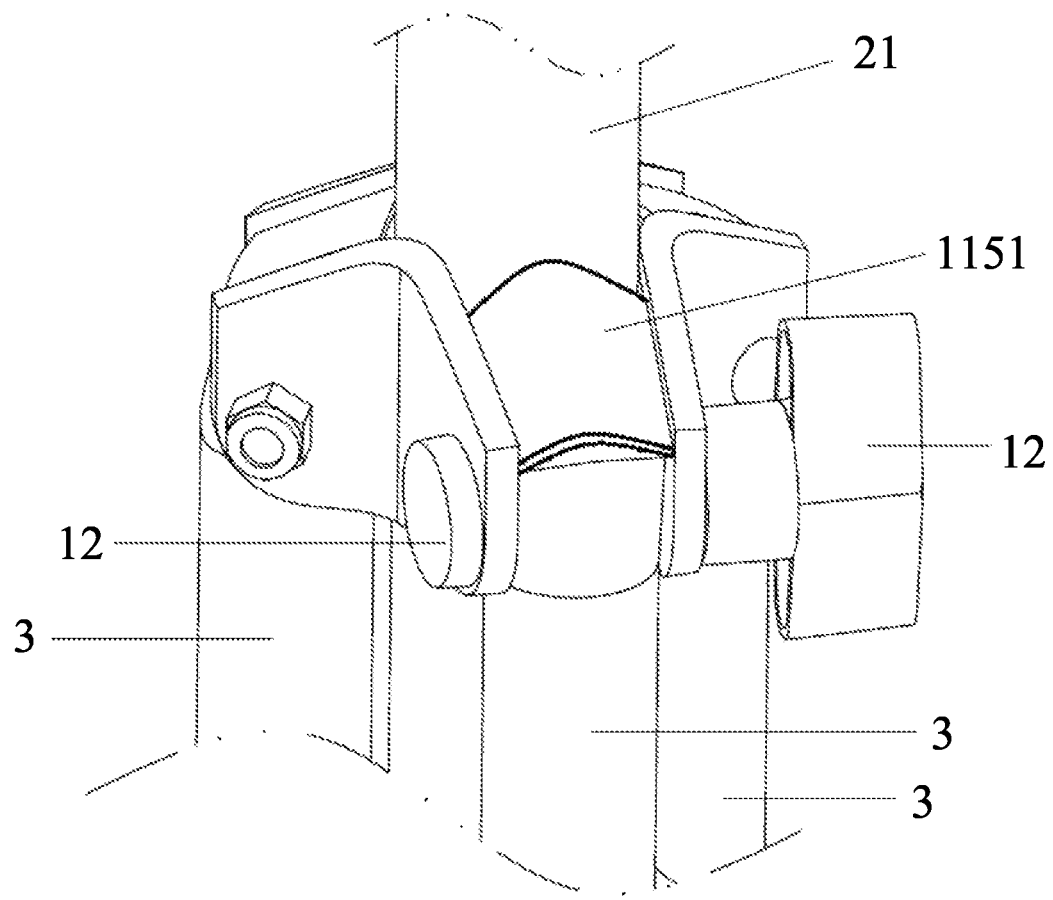
FIG. 6C is a partially schematic view showing an assembly that the first fastening assembly is in the locked state according to the third embodiment of the present invention.

As shown in FIG. 5A to FIG. 6C, in a third embodiment, the clamp sleeve further comprises three leg tubes 3, and the body 11 is provided with two second extending portions 116 and two third extending portions 117 at suitable positions outside the body 11 along the longitudinal direction. The second extending portions 116 are provided with a second connecting sheet 1161 at a position near the first opening 1133, and the second connecting sheet 1161 is connected to each of the two second extending portions 116 and connected with the first opening 1133. The third extending portions 117 are provided with a third connecting sheet 1171 at a position near the first opening 1133, and the third connecting sheet 1171 is connected to each of the two third extending portions 117 and connected with the first opening 1133. The second extending portions 116 and the third extending portions 117 respectively are provided with a second fastening assembly 13 and a third fastening assembly 14, such that one end of each of the three leg tubes 3 is disposed in a pivotable manner between the two first extending portions 115, between the two second extending portions 116, and between the two third extending portions 117 respectively by the first fastening assembly 12, the second fastening assembly 13, and the third fastening assembly 14. Herein, as shown in FIG. 6C, the object 2 is a central tube 21. When the central tube 21 is inserted into the receiving portion, as shown in FIG. 6A, and the first fastening assembly 12 is in a locked state, the gap 114 becomes narrower, the two first extending portions 115 close to each other, the first connecting sheet 1151 produces a breakage along the first thin thread 1152, the first connecting sheet 1151 bulges due to a push force applied thereon by the first extending portions 115, and this allows the central tube 21 and the body 11 to be fixed with respect to each other. As shown in FIG. 5A and FIG. 5B, when the first fastening assembly 12 is in a loosen state, the two first extending portions 115 are pushed away from each other due to a restoring force applied thereon by the first connecting sheet 1151, the gap 114 becomes wider, the first connecting sheet 1151 recovers to be flat, and this allows the central tube 21 and the body 11 to be slidable with respect to each other.

Figure 7A:
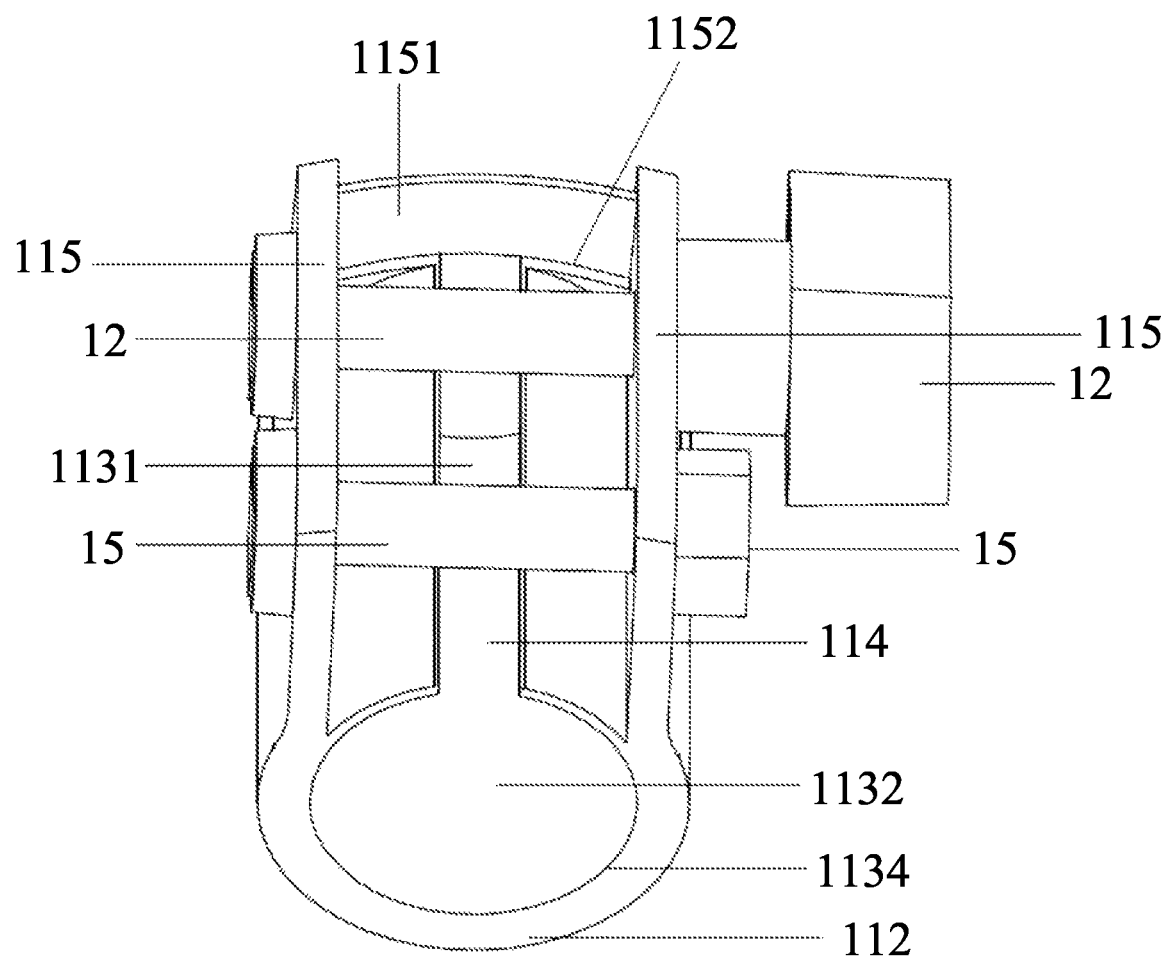
FIG. 7A is a first schematic view showing a first fastening assembly being in the loosen state according to a fourth embodiment of the present invention.
Figure 7B:
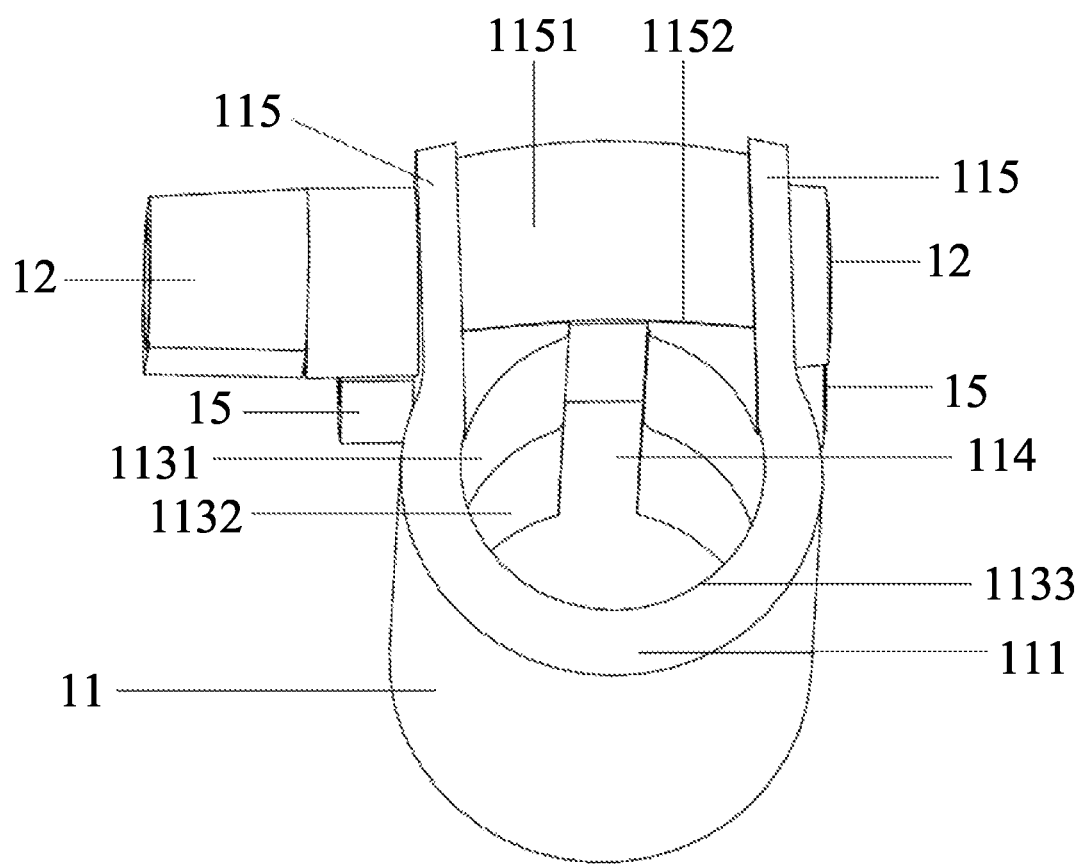
FIG. 7B is a second schematic view showing the first fastening assembly being in the loosen state according to the fourth embodiment of the present invention.
Figure 8:
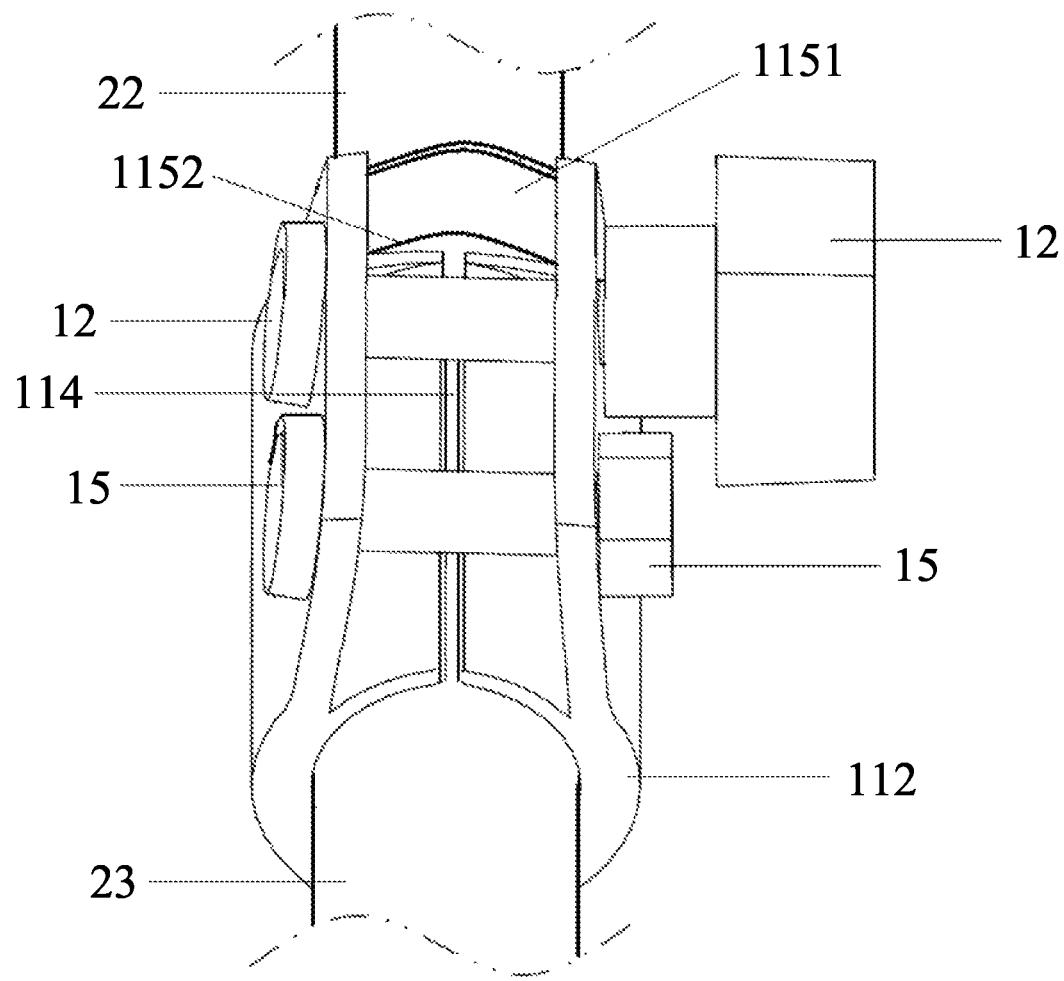
FIG. 8 is a schematic view showing an assembly that the first fastening assembly is in the loosen or locked state according to the fourth embodiment of the present invention.

As shown in FIG. 7A to FIG. 8, in a fourth embodiment, the first extending portion 115 is provided with a fourth fastening assembly 15, and the receiving portion 113 has an upper portion 1131 and a lower portion 1132 adjacent to each other. The upper portion 1134 is communicated with the first opening 1133, and the lower portion 1132 is communicated with the second opening 1134. A diameter of the upper portion 1131 is smaller than a diameter of the lower portion 1132. The object 2 includes an inner tube 22 and an outer tube 23, and a tube diameter of the inner tube 22 is smaller than a tube diameter of the outer tube 23. When the outer tube 23 is inserted into the lower portion 1132 through the second opening 1134 and the fourth fastening assembly 15 is in a locked state, the gap 14 becomes narrower, and the outer tube 23 and the body 11 are fixed with respect to each other. When the inner tube 22 is inserted into the upper portion 1131 through the first opening 1133 and received into the outer tube 23 and the first fastening assembly 12 is in a loosen state, the inner tube 22 and the outer tube 23 are slidable with respect to each other, and when the first fastening assembly 12 is in a locked state, the inner tube 22 and the body 11 are fixed with respect to each other.

The description and illustration above are merely a description for the preferred embodiments of the present invention. One skilled in the art may conduct further modifications based on the claims below and the description above, while these modifications should also be considered using the spirit of the present invention and should be included in the scope defined by the claims.

What is claimed is:

1. A clamp sleeve adapted to be sleeved on an object, comprising:
    a body having a first end and a second end, the body including a receiving portion therein, the receiving portion having a first opening and a second opening respectively at the first end and the second end, the body being provided with a gap at a suitable position of a circumference of the body, the gap having two ends respectively extending to the first opening and the second opening, the gap being communicated with the receiving portion, the body being provided with a first extending portion at a suitable position at each of two sides of the gap along a longitudinal direction thereof, the first extending portions being provided with a first connecting sheet at a position near the first opening, the first connecting sheet being connected to each of the two first extending portions and connected with the first opening, the first connecting sheet being provided with a first thin thread, the first thin thread intersecting with the gap; and
    a first fastening assembly disposed on each of the first extending portions;
    wherein when the object is inserted into the receiving portion and the first fastening assembly is in a locked state, the two first extending portions close to each other, the gap becomes narrower, the first connecting sheet produces a breakage along the first thin thread, and the first connecting sheet bulges due to a push force applied thereon by the first extending portions, and when the first fastening assembly is in a loosen state, the two first extending portions are pushed away from each other due to a restoring force applied thereon by the first connecting sheet, the gap becomes wider, and the first connecting sheet recovers to be flat.

2. The clamp sleeve according to claim 1, wherein a maintaining portion is disposed at a suitable position of the second end of the gap, the maintaining portion has two sides respectively connected with the body, and the maintaining portion is provided with a second thin thread at one side thereof.

3. The clamp sleeve according to claim 1, further comprising three leg tubes, wherein the body is provided with two second extending portion and two third extending portion at suitable positions outside the body along the longitudinal direction, the two second extending portions are provided with a second connecting sheet at a position near the first opening, the second connecting sheet is connected to each of the two second extending portions and connected with the first opening, the two third extending portions are provided with a third connecting sheet at a position near the first opening, the third connecting sheet is connected to each of the two third extending portions and connected with the first opening, the second extending portions and the third extending portions respectively are provided with a second fastening assembly and a third fastening assembly, such that one end of each of the three leg tubes is disposed in a pivotable manner between the two first extending portions, between the two second extending portions, and between the two third extending portions respectively by the first fastening assembly, the second fastening assembly, and the third fastening assembly.

4. The clamp sleeve according to claim 1, wherein the first extending portion is provided with a fourth fastening assembly, the receiving portion has an upper portion and a lower portion adjacent to each other, the upper portion is communicated with the first opening, the lower portion is communicated with the second opening, a diameter of the upper portion is smaller than a diameter of the lower portion, the object includes an inner tube and an outer tube, and a tube diameter of the inner tube is smaller than a tube diameter of the outer tube, wherein when the outer tube is inserted into the lower portion through the second opening and the fourth fastening assembly is in a locked state, the gap becomes narrower, and the outer tube and the body are fixed with respect to each other, when the inner tube is inserted into the upper portion through the first opening and received in the outer tube and the first fastening assembly is in a loosen state, the inner tube and the outer tube are slidable with respect to each other, and when the first fastening assembly is in a locked state, the inner tube and the body are fixed with respect to each other.

\* \* \* \* \*